US008615737B2

(12) United States Patent
Walsh et al.

(10) Patent No.: US 8,615,737 B2
(45) Date of Patent: Dec. 24, 2013

(54) SYSTEMS AND METHODS FOR BUILDING SOFTWARE PACKAGES IN SECURE DEVELOPMENT ENVIRONMENTS

(75) Inventors: Daniel J. Walsh, Marlborough, MA (US); Jason Greguske, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 161 days.

(21) Appl. No.: 12/977,704

(22) Filed: Dec. 23, 2010

(65) Prior Publication Data

US 2012/0167048 A1 Jun. 28, 2012

(51) Int. Cl.
*G06F 9/44* (2006.01)

(52) U.S. Cl.
USPC .................... 717/120; 717/101; 717/122

(58) Field of Classification Search
None
See application file for complete search history.

(56) References Cited

U.S. PATENT DOCUMENTS

| | | | | |
|---|---|---|---|---|
| 7,167,865 B1* | 1/2007 | Tharp et al. | ................ | 717/101 |
| 7,725,735 B2* | 5/2010 | Fox et al. | ................... | 713/188 |
| 7,882,227 B2* | 2/2011 | Faden | ........................ | 709/225 |
| 8,245,192 B1* | 8/2012 | Chen et al. | .................. | 717/122 |
| 2004/0068713 A1* | 4/2004 | Yannakoyorgos et al. | ... | 717/120 |
| 2004/0093593 A1* | 5/2004 | Jhanwar et al. | ............. | 717/120 |
| 2005/0044531 A1* | 2/2005 | Chawla et al. | .............. | 717/120 |
| 2006/0230289 A1* | 10/2006 | Fox et al. | ................... | 713/188 |
| 2007/0198714 A1* | 8/2007 | Faden | ........................ | 709/225 |
| 2008/0127077 A1* | 5/2008 | Burdick et al. | ............. | 717/120 |
| 2009/0300151 A1* | 12/2009 | Friedman et al. | .......... | 717/120 |
| 2010/0131559 A1* | 5/2010 | van Riel et al. | ............. | 707/783 |
| 2010/0132011 A1* | 5/2010 | Morris et al. | ................ | 726/1 |
| 2010/0132012 A1* | 5/2010 | van Riel et al. | ............. | 726/1 |
| 2010/0132013 A1* | 5/2010 | van Riel et al. | ............. | 726/1 |
| 2010/0192120 A1* | 7/2010 | Raleigh | ...................... | 717/101 |
| 2011/0047613 A1* | 2/2011 | Walsh | ........................ | 726/16 |
| 2011/0154431 A1* | 6/2011 | Walsh | ........................ | 726/1 |
| 2011/0276939 A1* | 11/2011 | Frankin et al. | ............. | 717/101 |
| 2011/0296487 A1* | 12/2011 | Walsh | ........................ | 726/1 |
| 2012/0036581 A1* | 2/2012 | Maximilien et al. | ........ | 726/26 |
| 2012/0167157 A1* | 6/2012 | Walsh et al. | ................ | 726/1 |
| 2012/0204148 A1* | 8/2012 | Burdick et al. | ............. | 717/120 |

OTHER PUBLICATIONS

Stacy Simpson, "Fundamental Practices for Secure Software Development", Oct. 8, 2008, SAFECode, pp. 1-19; <http://www.safecode.org/publications/SAFECode_Dev_Practices1108.pdf>.*
Fichtinger et al., "Driving Secure Software Development", 2012 IEEE, pp. 97-101; <http://ieeexplore.ieee.org/stamp/stamp.jsp?tp=&arnumber=6173008>.*
Futcher et al., "Guidelines for Secure Software Development", 2008 ACM, SAICSIT 2008, pp. 56-65; <http://dl.acm.org/citation.cfm?doid=1456659.1456667>.*
Walsh et al., Systems and Methods for Secure Software Development Environment, U.S. Appl. No. 12/975,408, filed Dec. 22, 2010.

* cited by examiner

*Primary Examiner* — Thuy Dao
*Assistant Examiner* — Ben C Wang
(74) *Attorney, Agent, or Firm* — Lowenstein Sandler LLP

(57) ABSTRACT

The mock tool can be configured to create a mock execution environment for building software packages. The mock execution environment is isolated from resources of the computing system supporting the mock execution environment and other mock execution environments. Further, the mock execution environment can be created to simulate disabling on any features of the operating system supporting the mock execution environment that could cause problems in the building the software packages.

14 Claims, 4 Drawing Sheets

SYSTEMS AND METHODS FOR BUILDING SOFTWARE PACKAGES IN SECURE DEVELOPMENT ENVIRONMENTS

FIELD

This invention relates generally to computer software development for computing systems.

DESCRIPTION OF THE RELATED ART

In the Open Source software community, many collaborative projects exist that allow developers to pool resources in order to develop software. For example, Fedora™ currently allows people to sign a Contributor License Agreement (CLA) with fedoraproject.org and to develop software on collaborative computing systems, which are dedicated to Fedora development. For instance, Developer A could volunteer to create a software package, "Software B" for Fedora. As long as a current Fedora packager "sponsors" Developer A and Developer A signs the CLA, Developer A will be allowed to build "Software B" in the collaborative computing systems. Developer A would not be allowed to build other packages, for example, httpd (Apache).

This could present a security risk to the collaborative computing systems. Once given access to the collaborative computing systems, Developer A has the ability to run random code on the computing systems because most of the code required to build the software packages runs with high privileges. As such, Developer A has the ability to attack the collaborative computing systems. Likewise, Developer A also has the ability to attack other computing systems from the collaborative computing system. For example, Developer A can insert a spammer agent on the collaborative computing system to spam other computing systems. Additionally, Developer A has the ability to attack other packages that may be building simultaneously when Developer A's build is running. For example, "Software B" build can be running simultaneously with the httpd build. Developer A could attack the httpd build and inject code into it, that if not noticed would eventually be signed by Fedora and potentially installed on all Fedora computing system.

Currently, secure operating systems, such as security enhanced Linux SELinux, cannot be used in the collaborative computing systems. This is due to a lack of flexibility to develop software across different operating systems and versions. For example, a developer can build software for a Red Hat™ Enterprise Linux version 5 (RHEL5) computing system on a development environment running Fedora version 13. If SELinux is enabled, and the development environment installed an SELinux policy package, the policy package would tell the kernel to use the RHEL5 policy on the development environment running Fedora 13 and the build would break. Thus, there exists a need to create development environments that are secure and can support cross platform development.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for creating a mock execution environment for software development processes. According to embodiments, a mock tool can be configured to create a mock execution environment for building software packages. The mock execution environment is isolated from resources of the computing system supporting the mock execution environment and other mock execution environments.

According to embodiments, the mock execution environment can be created to simulate disabling of any features of the operating system, supporting the mock execution environment, that could cause problems in the build of the software package. The mock tool creates the execution environment so that the software package build, running in the mock execution environment, believe that the incompatible features are disabled, but the features are still available for use in creating and managing the mock execution environment.

By isolating the mock execution environment, computing systems can support collaborative software development without the fear of developers introducing malicious code into the computing systems. Likewise, by simulating disabling of incompatible features, the computing systems can support cross-platform development while maintaining security.

Figure 1:
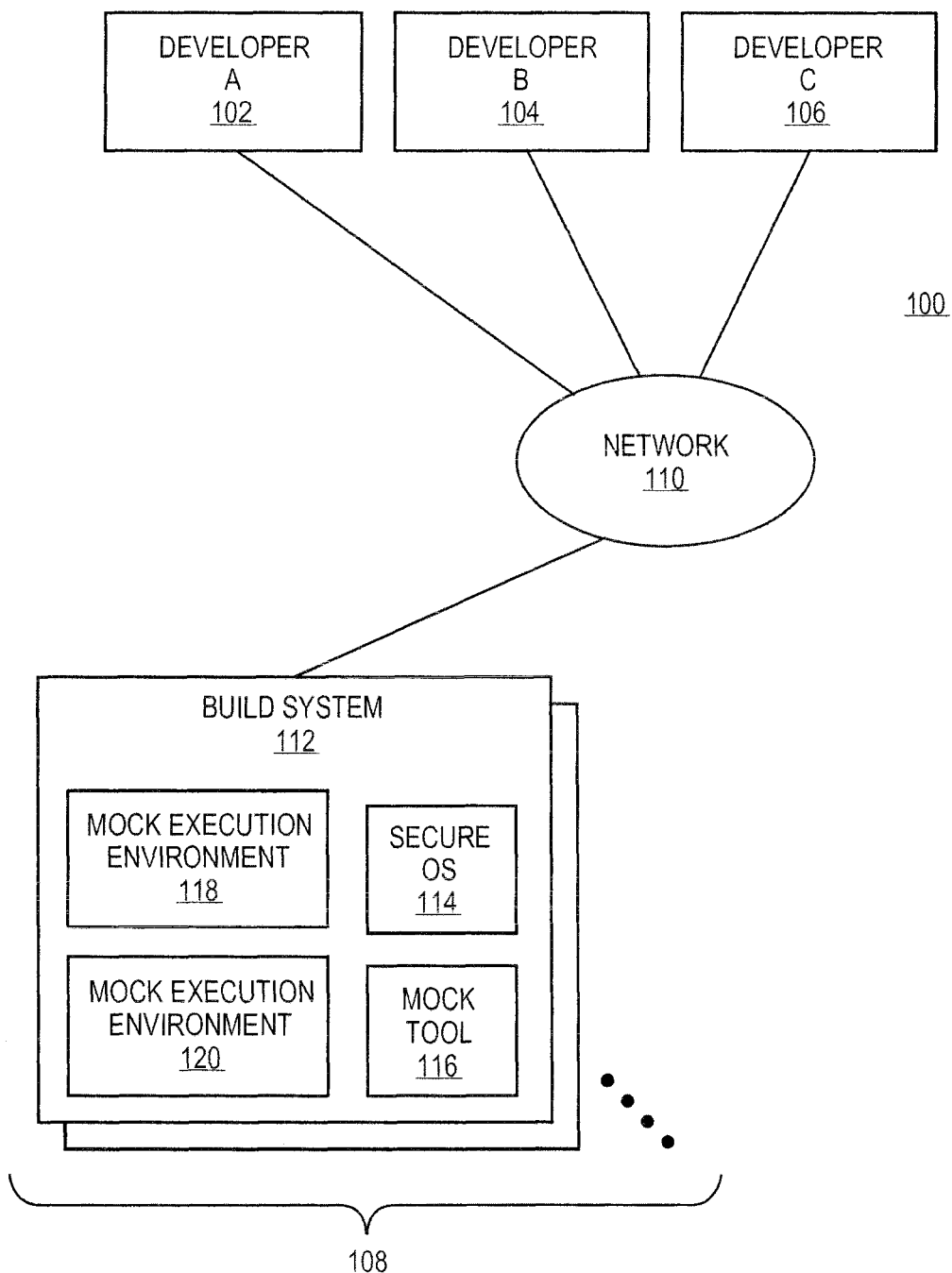
FIG. 1 illustrates an example of a software development environment including a mock tool, in which various embodiments of the present teachings can be practiced.

FIG. 1 illustrates an example of a software development environment 100, according to various embodiments of the present teachings. While FIG. 1 illustrates various components that can be included in the software development environment 100, one skilled in the art will realize that additional components can be added or existing components can be removed.

As illustrated in FIG. 1, the software development environment 100 can be designed to allow software developers, such as developer A 102, developer B 104, and developer C 106 to communicate with build systems 108 via one or more networks 110. The developer A 102, developer B 104, and/or developer C 106 can communicate with the build systems 108 in order to perform various process associated with software development, for example, design and test software programs such as operating systems (OS) and application programs, build software packages, and the like.

Each build system 112 of the build systems 108 can be any type of computing system capable of supporting software development processes and capable of communicating with the one or more networks 110. For example, the build system 112 can be any type of conventional computing system or other device such as such as a server, a personal computer, a laptop computer, a network-enabled media device, a networked station, etc. As such, the build system 112 can include conventional hardware such as processors, memory, computer readable storage media and devices (CD, DVD, hard drive, portable storage memory, etc.), network devices, and the like.

The build system 112 can be configured to store and execute a secure OS 114, such as security enhanced Linux ("SELinux"), available from Red Hat™, Inc. In this example, SELinux implements a monolithic kernel which is configured to provide an X-Window computing environment to the build system 112. SELinux is a version of Linux that integrates FLASK architectural components to provide general support for the enforcement of many kinds of mandatory security policies, including those based on the concepts of type enforcement, role-based access control ("RBAC"), and multi-level security. Likewise, the build system 112 can be configured to store and execute any other type of conventional software programs.

The one or more networks 110 can be or include the Internet, or other public or private networks. The one or more networks 110 can be or include wired, wireless, optical, and other network connections. One skilled in the art will realize that the one or more networks 110 can be any type of network, utilizing any type of communication protocol, to connect computing systems.

In embodiments, the developer A 102, developer B 104, and/or developer C 106 can desire to use the build systems 108, such as build system 112, to perform software development processes. The build systems 108, however, can desire to protect the build systems 108 from any malicious code or agents that the developer A 102, developer B 104, and/or developer C 106 might attempt to run on the build systems 108.

In embodiments, the build systems 108, such as build system 112, can include a mock tool 116. The mock tool 116 can be configured to cooperate with components of the secure OS 114 to create a mock execution environment 118 for performing software development processes without exposing other processes and resources of the build systems 108 to the malicious code or agents that might be introduced by the developer A 102, developer B 104, and/or developer C 106. In particular, with reference to build system 112, the mock tool 116 can be configured to allocate resources (storage space, memory, etc) of the build system 112, which are necessary to perform the software development processes, to the mock execution environment 118, and apply security polices of the secure OS 114 to the mock execution environment 118 such that processes running in the mock execution environment 118 can only access the resources allocated to the mock execution environment 118. As such, the build system 112 can support software development without exposing the build system 112, other mock execution environments, and other build systems 108 to any possible malicious or dangerous content.

In embodiments, the mock tool 116 can be configured to create and maintain multiple mock execution environments, such as the mock execution environment 118 and a mock execution environment 120. For instance, separate mock execution environments can be created for each of the developer A 102, developer B 104, and developer C 106. In this instance, each mock execution environment can perform software development processes while the mock tool 116 maintains the isolation of each mock execution environment from the resources of the build systems 108 and from other mock execution environments.

In embodiments, as illustrated, the mock tool 116 can be implemented as a standalone application that communicates with the components of the secure OS 114. Likewise, the mock tool 116 can be implemented as part of the secure OS 114. In either case, the mock tool 116 can be written in any type of known open-source or proprietary programming language, such as C, C++, JAVA, etc. As such, the mock tool 116 can be configured to include the necessary logic, commands, protocols, and algorithms to perform the processes described below. The build systems 108 can store and execute the secure OS 114 and the mock tool 116.

To create the mock execution environment 118, the mock tool 116 can be configured to establish (or instruct the secure OS 114 to establish) a chroot environment for the mock execution environment 118. The chroot environment is a restricted directory file system below the actual root file system of the build system 112. The mock tool 116 can be configured to establish any naming convention for directories of the chroot environment such as "/var/run/mock" and "/var/lib/mock".

Once the chroot environment is created, the mock tool 116 can be configured to mount (or instruct the secure OS 114 to mount) any required system files in the chroot environment. For example, the mock tool 116 can be configured to mount systems files such as "/proc" and "/sys" files in the chroot environment. As mentioned above, the build system 112 can be configured to include the secure OS 114, such as SELinux. In order to allow the mock execution environment 118 to perform any type of development process, whether or not the process is compatible with the secure OS 114, the mock tool 116 can configure the mock execution environment 118 so that the processes running in the mock execution environment believe that the secure functionality of the secure OS 114 is disabled.

For example, with SELinux, the "libselinux" application programming interface (API) identifies whether SELinux is enabled by reading the file "/proc/filesystem" and looking for "selinuxfs" statements in the file. For example, the "libselinux" API can search the "/proc/filesystem" using the following pseudo code to identify if SElinux is enabled:

```
grep selinux /proc/filesystem
nodev selinuxfs
```

If this line "selinuxfs" is not present within the file, the "libselinux" API will tell all calling processes that SELinux is disabled.

To simulate SELinux being disabled in the mock execution environment 118, the mock tool 116 can be configured to mount (or instruct the secure OS 114 to mount) the "/proc" file in the chroot environment. The mock tool 116 can also be configured to create (or instruct the secure OS 114 to create) a file with the contents "/proc/filesystem" in which any "selinuxfs" statements have been eliminated and can be configured to mount this file in the chroot environment. The mock tool 116 can utilize the following pseudocode to create and mount the files:

```
mount -o bind /proc /var/lib/mock/chroot/proc
grep -v selinuxfs /proc/filesystem > /var/run/mock/myfilesystem
mount -o bind /var/run/mock/myfilesystem
    /var/lib/mock/chroot/proc/filesystem
```

Once the chroot environment has been established and the files mounted, the mock tool 116 can be configured to establish (or instruct the secure OS 114 to establish) security policies of the secure OS 114, for example SELinux policies, that define the access to the files and resources of the build system 112 for the mock execution environment 118. For example, the mock tool 116 can establish that all processes in the mock execution environment 118 will run as "mock_t" and all files created will be labeled as "mock_file_t". As such, all the processes will run as "mock_t" and will only be able to access files labeled "mock_file_t". Additionally, the security policy can specify the resources of the build systems 112 that any process labeled "mock_t" can access. For example, the security policy can specify the network ports, memory locations, processors, etc. that any process labeled "mock_t" can access.

As mentioned above, the mock tool 110 can be configured to create and/or maintain one or more mock execution environments, simultaneously. For example, as illustrated in FIG. 1, the mock tool 116 can create the mock execution environment 118 for the developer A 102 and can create the mock execution environment 120 for the developer B 104. The mock execution environments 118 and 120 can have the same security policies, for example, the same levels of access to the resources of the build system 112 or different security policies. In order to keep the mock execution environments 118 and 120 isolated from each other, the mock tool 116 can be configured to assign (or instruct the secure OS 114 to assign) unique security labels to each of the mock execution environments 118 and 120. As such, the mock tool 116 can create the mock execution environments 118 and 120 which co-exist and have the same (or different) level of access, but remain isolated from each other.

For example, when creating the mock execution environment 118 in SELinux, the mock tool 116 can select (or instruct the secure OS 114 to select) a unique, random multi-category security (MCS) label (e.g. "MCS1"). The mock tool 116 can label the chroot environment for the mock execution environment 118 as "mock_file_t:MCS1" and can start any processes as "mock_t:MCS1". When creating the mock execution environment 120, the mock tool 116 can select (or instruct the secure OS 114 to select) a different MCS label (e.g. "MCS2"). The mock tool 116 can label the chroot environment for the mock execution environment 120 as "mock_file_t:MCS2" and can start any processes as "mock_t: MCS2". To ensure that the MCS labels for the different environments are different and unique, the mock tool 116 can select and assign labels in the form "s0: c1, c2" where the c1 and c2 are two MCS categories that are randomly selected.

While FIG. 1 illustrates two mock execution environments, one skilled in the art will realize that the mock tool 116 can create any number of mock execution environments on any of the build systems 108. Likewise, while the mock tool 116 can isolate the mock execution environments from each other, the mock tool 116 can assign security labels that would allow different mock execution environments to communicate.

Figure 2:
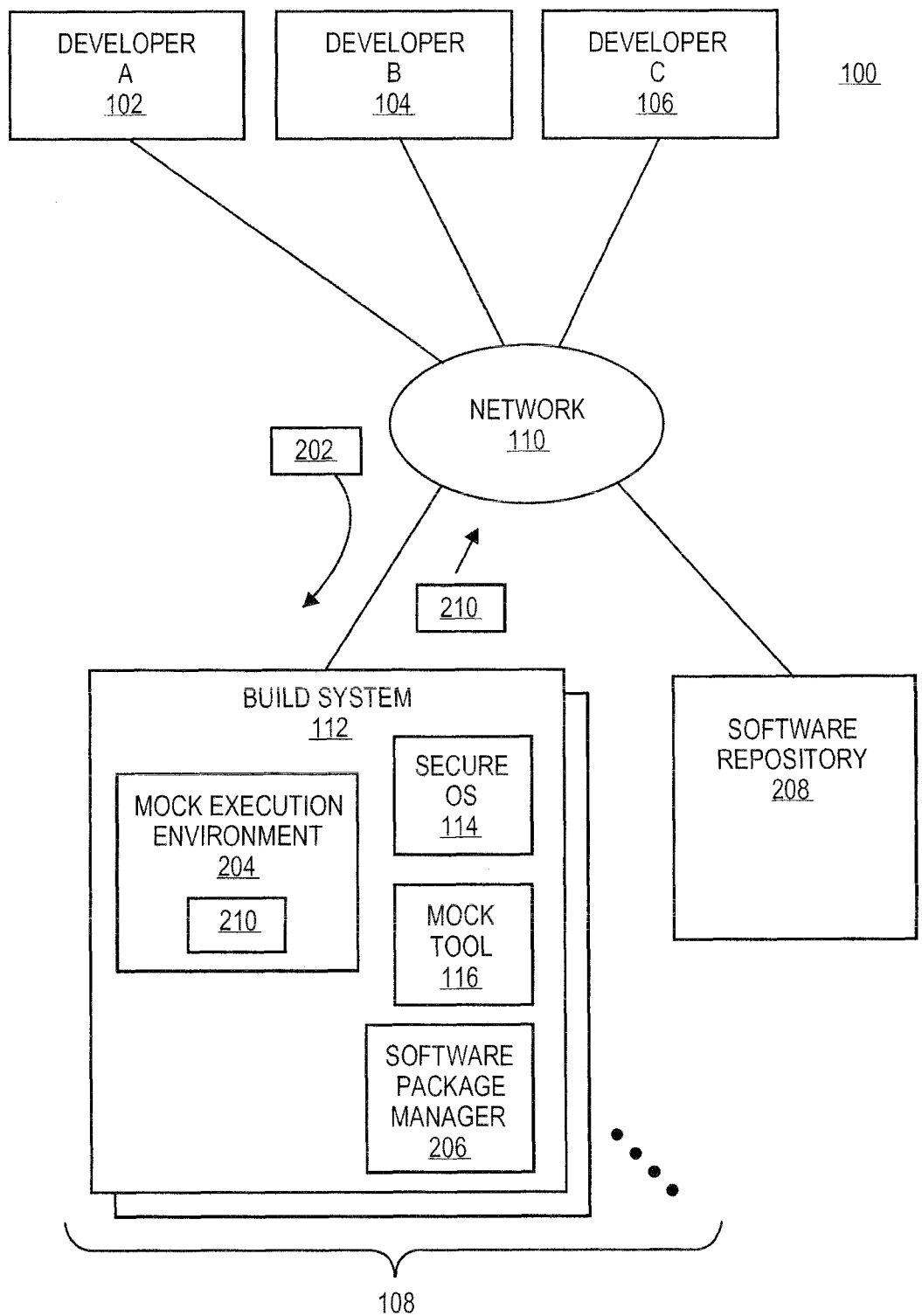
FIG. 2 illustrates another example of a software development environment including the mock tool for building software packages, according to various embodiments.

As mentioned above, the developers A 102, developer B 104, and developer C 106 can utilize the build systems 108 for a variety of software development processes. FIG. 2 illustrates another example of the software development environment 100 in which the build systems can be utilized to build software packages, according to various embodiments. While FIG. 2 illustrates various components that can be included in the software development environment 100, one skilled in the art will realize that additional components can be added or existing components can be removed.

A software package includes one or more software programs or software program updates that are packaged together in a format that allows a software package manger or software package installer to install the software programs or updates. The software programs included in the software package can be any type of software programs such as operating systems (OS), application programs, and the like or updates to these software programs. The software package can also include metadata that describes the software package, such as the name of the software package, the software programs included in the package, epoch, version and release of the software package, architecture for which the software package was built, description of the purpose of the software packages, etc. The software package can also include metadata that aids in the installation of the software programs contained in the software package, such as checksums, format of the checksums, and a list of dependencies of the software packages. The checksums verify the integrity of the files of the software package, e.g. that the files of the software packages are complete and correct. The list of dependencies can describe the relationship of the software programs or software program updates contained in the software package and any other software programs, file, software libraries, etc. required by the software packages.

As illustrated in FIG. 2, the developer A 102 can desire to build a software package on the build system 112. The developer A 102 can send a request 202 to the build system 112 via the one or more networks 110. The request 202 can include the specifications of the software package to be built. For example, the request can include a source package file such as "src.rpm" file. The "src.rpm" file describes all the files, software programs, software packages etc. that are included in the software package to be built and how to build the software package.

Once received, the mock tool 116 can create a mock execution environment 204 in which to build the software package. The mock tool 116 can create the mock execution environment 204 as described above in FIG. 1. As described above, the mock tool 116 can be configured to allocate resources (storage space, memory, etc) of the build system 112, which are necessary to perform the software package build, to the mock execution environment 204, and apply security polices of the secure OS 114 to the mock execution environment 204 such that processes running in the mock execution environment 204 can only access the resources allocated to the mock execution environment 204. As such, the build system 112 can support the software package build without exposing the build system 112, other mock execution environments, and other build systems 108 to any possible malicious or dangerous content.

Once the mock execution environment 204 is created, the mock tool 116 can be configured to copy any files, software programs, software packages etc. required to build the software package to the mock execution environment 204. For example, the mock tool 116 can examine the "src.rpm" file to determine the files, software programs, software packages etc. required to build the software package.

To copy the files, software programs, software packages etc., the mock tool 116 can be configured to communicate with a software package manager 206. The software package manager 206 can be any application program that is capable of executing on the build system 112 to retrieve files, software programs, software packages etc from a software repository 208. For example, the software package manager 206 can be any type of conventional open-source or proprietary package manager such as Yum package manager, Debian™ package manager, and the like. The software package manager 206 can be stored on computer readable storage devices or media (CD, DVD, hard drive, portable storage memory, etc.) of the build system 112 and executed by the build system 112. Likewise, the software package manager 206 can be incorporated as part of the mock tool 116.

The software repository 208 can store files, software programs, software packages etc. in any type of open-source or proprietary format depending on the type of the software repository. For example, the files, software programs, software packages etc. can be in conventional formats such as RPM format for a Yum repository, .deb format for a Debian™ repository, or other conventional archival formats such as .jar .zip, tar.gz, and the like.

The software repository 208 can be supported by any type of computing system(s) capable of storing the files, software programs, software packages etc., capable of communicating with the one or more networks 110 and capable of running a repository application for cooperating with a software package manager or software package installer in order to deliver the files, software programs, software packages etc. For example, the software repository 208 can be supported by conventional computing systems or other devices such as such as servers, personal computers, laptop computers, network-enabled media devices, networked stations, etc. As such, the computing systems supporting the software repository 208 can include conventional hardware such as processors, memory, computer readable storage media and devices (CD, DVD, hard drive, portable storage memory, etc.), network devices, and the like. Likewise, the software repository 208 can be supported by one or more of the build systems 108.

Once the required files, software programs, software packages etc. have been copied to the mock execution environment 204. The mock tool 116 can be configured to initiate building a software package 210 according to the specifications received in the request 202. Once the software package 210 is built, the mock tool 116 can be configured to store the software package 210 in the build system 112 for access by the developer A 102. Likewise, the mock tool 116 can be configured to transmit the software package to the developer A 102 or other entity (e.g. developer B 104, developer C 106, software repository 208, and the like) via the one or more networks 110.

Figure 3:
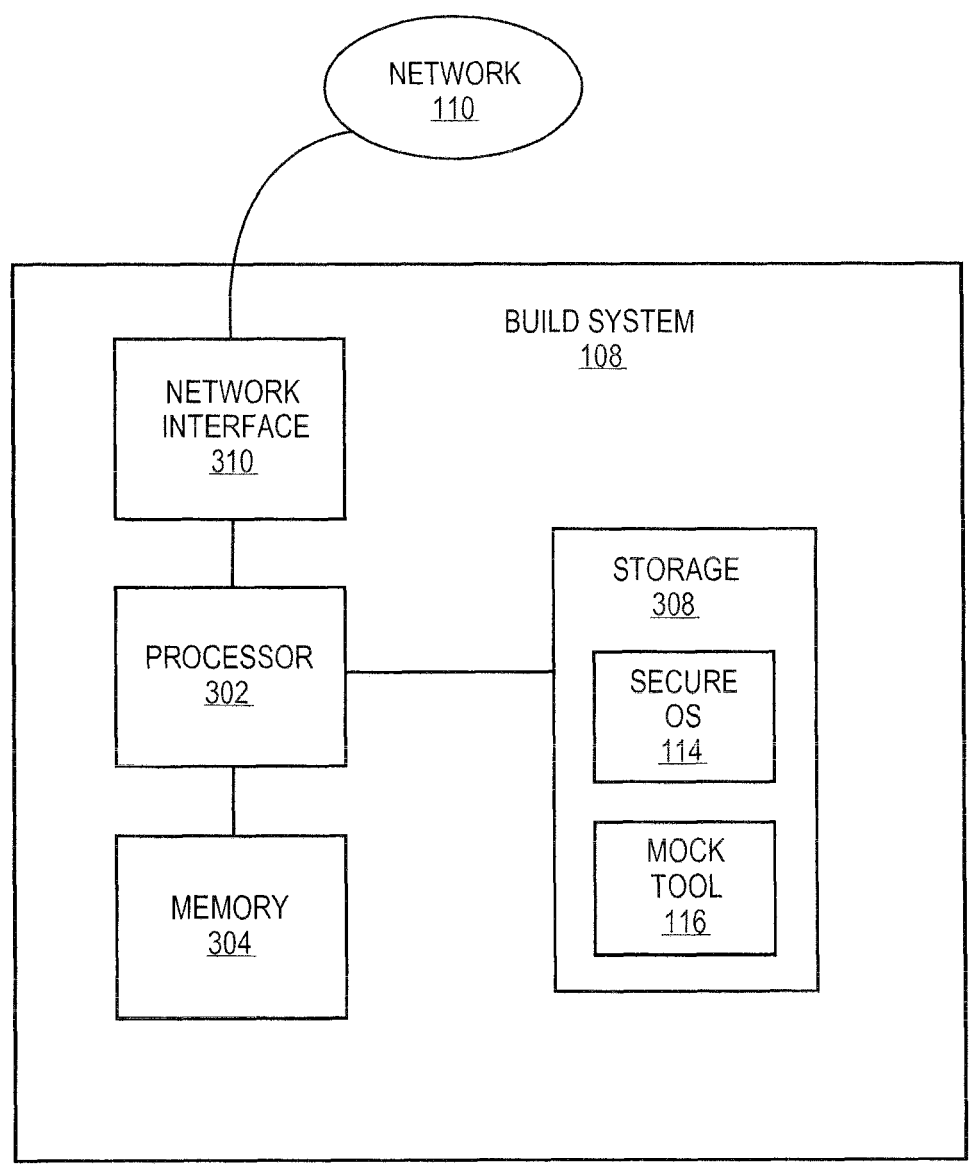
FIG. 3 illustrates an exemplary hardware configuration for a computing system capable of executing the mock tool, according to various embodiments.

FIG. 3 illustrates an exemplary diagram of hardware and other resources that can be incorporated in any of the build systems 108, and configured to store and execute the mock tool 116, according to embodiments. In embodiments as shown, the build systems 108 can comprise a processor 302 communicating with a memory 304, such as electronic random access memory, operating under control of or in conjunction with the secure OS 114. The secure OS 114 can be, for example, a distribution of the Linux™ operating system, such as Red Hat™ Enterprise Linux, Fedora, etc., the Unix™ operating system, or other open-source or proprietary operating system or platform. The processor 302 also communicates with one or more computer readable storage devices or media 308, such as hard drives, optical storage, and the like, for maintaining the secure OS 114 and the mock tool 116. The processor 302 further communicates with network interface 310, such as an Ethernet or wireless data connection, which in turn communicates with one or more networks 110, such as the Internet or other public or private networks.

The processor 302 also communicates with the mock tool 116 to execute the logic of the mock tool 116 and to allow performance of the processes as described herein. Other configurations of the build system 108, associated network connections, and other hardware and software resources are possible.

While FIG. 3 illustrates the build system 108 as a standalone system including a combination of hardware and software, the build system 108 can include multiple systems operating in cooperation. As described above, the mock tool 116 can be implemented as an application program capable of being executed by the build system 108, as illustrated, or other conventional computer platforms. Likewise, the mock tool 116 can also be implemented as a software module or program module capable of being incorporated in other software applications and programs, such as the secure OS 114 of the build system 108. In any example, the mock tool 116 can be implemented in any type of programming language. When implemented as an application program, application module, or program code, the mock tool 116 can be stored in a computer readable storage medium, such as the storage 308, accessible by the build system 108. Likewise, during execution, a copy of the mock tool 116 can be stored in the memory 304.

Figure 4:
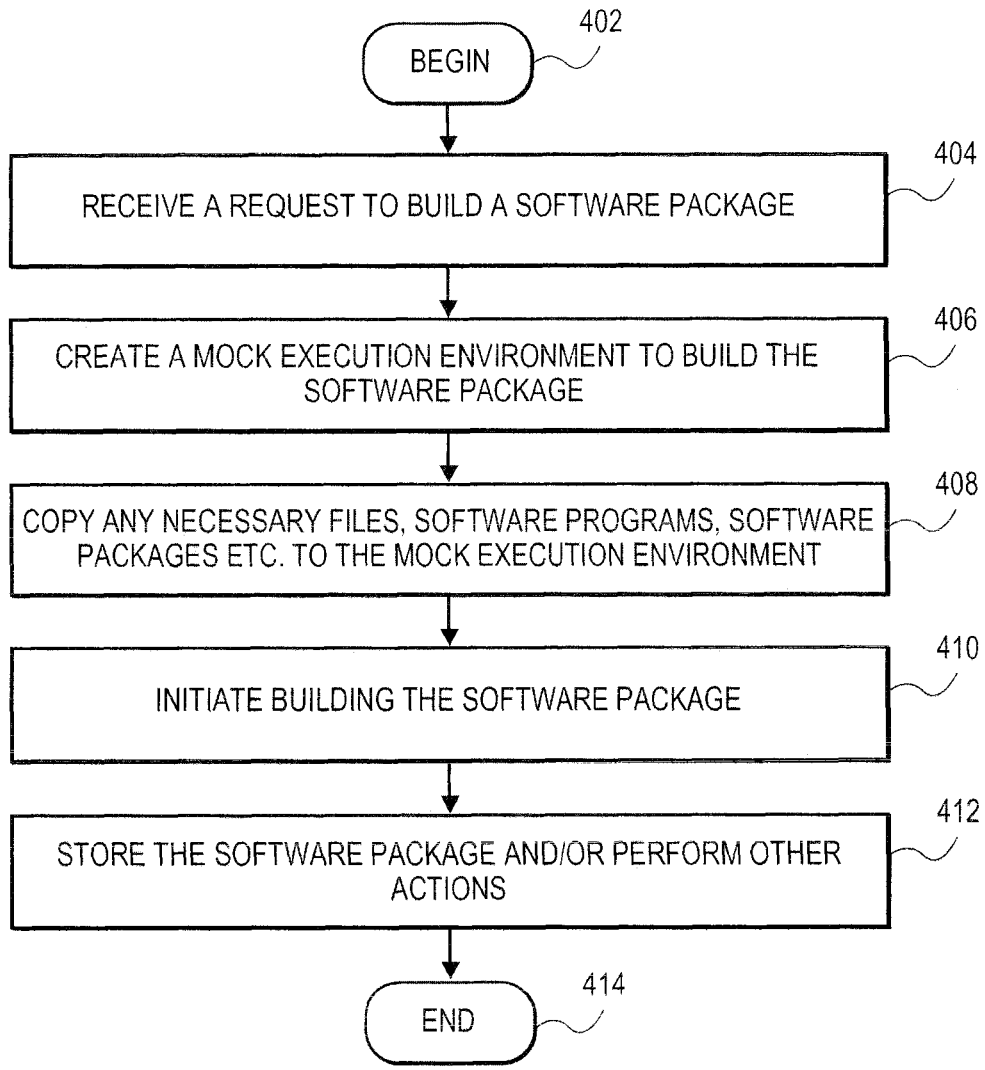
FIG. 4 illustrates a flowchart of an exemplary process for building a software package in a mock execution environment, according to various embodiments.

FIG. 4 illustrates a flow diagram for a process 400 of building a software package in a mock execution environment, according to embodiments of the present teachings. In 402, the process can begin. In 404, the mock tool 116 can receive a request to build the software package. For example, the developer A 102 can send a request 202 to the build system 112 via the one or more networks 110. The request 202 can include the specifications of the software package to be built. For example, the request can include a source package file such as "src.rpm" file. The "src.rpm" file describes all the files, software programs, software packages etc. that are included in the software package to be built and how to build the software package.

In 406, the mock tool 116 can create a mock execution environment 118 to build the software package. The mock tool 116 can create the mock execution environment 204 as described above in FIG. 1. As described above, the mock tool 116 can allocate resources (storage space, memory, etc) of the build system 112, which are necessary to perform the software package build, to the mock execution environment 204, and apply security polices of the secure OS 114 to the mock execution environment 204 such that processes running in the mock execution environment 204 can only access the resources allocated to the mock execution environment 204. As such, the build system 112 can support the software package build without exposing the build system 112, other mock execution environments, and other build systems 108 to any possible malicious or dangerous content.

In 408, the mock tool 116 can copy any necessary files, software programs, software packages etc. to the mock execution environment. The mock tool 116 can communicate with a software package manager 206 to copy the necessary files, software programs, software packages etc., identified in the specifications, from a software repository 208.

In 410, the mock tool 116 can initiate building the software package. The mock tool 116 can initiate building a software package 210 according to the specifications received in the request 202.

In 412, the mock tool 116 can store the software package and/or perform other actions. For example, the mock tool 116 can store the software package 210 in the build system 112 for access by the developer A 102. Likewise, the mock tool 116 can transmit the software package to the developer A 102 or other entity (e.g. developer B 104, developer C 106, software repository 208, and the like) via the one or more networks 110. In 414, the process can end, repeat, or return to any point.

Certain embodiments can be performed as a computer application program. The application program can exist in a variety of forms both active and inactive. For example, the application program can exist as software program(s) comprised of program instructions in source code, object code, executable code or other formats. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software of the computer application program on a CD-ROM or via Internet download.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    receiving a request to build a software package, wherein the request comprises specifications of the software package;
    creating, by a processor, a development environment in a computing system, wherein the development environment has limited access to resources of the computing system;
    creating and mounting a system file in the development environment, the system file to simulate disabling of features of an operating system of the computing system that conflict with the software package;
    selecting, by the processor, a security label for the development environment, wherein the security label prevents the development environment from accessing other development environments executing on the computing system;
    copying files to the development environment based on the specifications; and
    building in the development environment, the software package utilizing the files.

2. The method of claim 1, wherein selecting the security label comprises randomly selecting the security label.

3. The method of claim 1, wherein creating the system file comprises: removing statements that reference features of an existing system file of the operating system.

4. The method of claim 1, further comprising storing the software package in the computing system.

5. The method of claim 1, wherein the resources comprise hardware resources of the computing system and software resources of the computing system.

6. A non-transitory computer readable medium comprising instructions for causing a processor to perform operations comprising:
    receiving, at the processor, a request to build a software package, wherein the request comprises specifications of the software package;
    creating, by the processor, a development environment in a computing system, wherein the development environment has limited access to resources of the computing system;
    creating and mounting a system file in the development environment, the system file to simulate disabling of features of an operating system of the computing system that conflict with the software package;
    selecting, by the processor, a security label for the development environment, wherein the security label prevents the development environment from accessing other development environments executing on the computing system;
    copying files to the development environment based on the specifications; and
    building, in the development environment, the software package utilizing the files.

7. The non-transitory computer readable medium of claim 6, wherein selecting the security label comprises randomly selecting the security label.

8. The non-transitory computer readable medium of claim 6, wherein creating the system file comprises removing statements that reference features of an existing system file of the operating system.

9. The non-transitory computer readable medium of claim 6, further comprising storing the software package in the computing system.

10. The non-transitory computer readable medium of claim 6, wherein the resources comprise hardware resources of the computing system and software resources of the computing system.

11. A system comprising:
    a memory comprising instructions; and
    a processor coupled to the memory, the processor to execute the instructions to perform operations comprising:
    receiving a request to build a software package, wherein the request comprises specifications of the software package;
    creating a development environment in a computing system, wherein the development environment has limited access to resources of the computing system;
    creating and mounting a system file in the development environment, the system file to simulate disabling of features of an operating system of the computing system that conflict with the software package;
    selecting a security label for the development environment, wherein the security label prevents the development environment from accessing other development environments executing on the computing system;
    copying files to the development environment based on the specifications; and building, in the development environment, the software package utilizing the files.

12. The system of claim 11, wherein selecting the security label comprises randomly selecting the security label.

13. The system of claim 11, wherein creating the system file comprises: removing statements that reference features of an existing system file of the operating system.

14. The system of claim 11, further comprising storing the software package in the computing system.

* * * * *